US011901639B2

(12) United States Patent
Flores-Cuadras

(10) Patent No.: US 11,901,639 B2
(45) Date of Patent: Feb. 13, 2024

(54) QUAD 5G NR MIMO ANTENNA ARRAY WITH TRANSMISSION LINES

(71) Applicant: 2J ANTENNAS USA, CORPORATION, Gilbert, AZ (US)

(72) Inventor: Javier Ruben Flores-Cuadras, Chandler, AZ (US)

(73) Assignee: 2J ANTENNAS USA, CORPORATION, Gilbert, AZ (US)

( * ) Notice: Subject to any disclaimer, the term of this patent is extended or adjusted under 35 U.S.C. 154(b) by 0 days.

(21) Appl. No.: 17/676,402

(22) Filed: Feb. 21, 2022

(65) Prior Publication Data

US 2022/0173529 A1 Jun. 2, 2022

Related U.S. Application Data

(62) Division of application No. 17/004,387, filed on Aug. 27, 2020.

(60) Provisional application No. 62/892,350, filed on Aug. 27, 2019.

(51) Int. Cl.

| | |
|---|---|
| ***H01Q 21/26*** | (2006.01) |
| ***H01Q 5/47*** | (2015.01) |
| ***H01Q 1/42*** | (2006.01) |
| ***H01Q 1/38*** | (2006.01) |
| ***H01Q 21/28*** | (2006.01) |
| ***H01Q 3/26*** | (2006.01) |
| ***H01Q 21/12*** | (2006.01) |

(52) U.S. Cl.

CPC ............... *H01Q 21/26* (2013.01); *H01Q 1/38* (2013.01); *H01Q 1/42* (2013.01); *H01Q 3/2617* (2013.01); *H01Q 5/47* (2015.01); *H01Q 21/12* (2013.01); *H01Q 21/28* (2013.01)

(58) Field of Classification Search

CPC ........... H01Q 21/26; H01Q 1/38; H01Q 1/42; H01Q 3/2617; H01Q 5/47; H01Q 21/12; H01Q 21/28

See application file for complete search history.

(56) References Cited

U.S. PATENT DOCUMENTS

| | | | | |
|---|---|---|---|---|
| 2018/0309204 | A1* | 10/2018 | Ng | H01Q 9/0407 |
| 2021/0391916 | A1* | 12/2021 | Singh | H04B 17/318 |
| 2022/0006178 | A1* | 1/2022 | Shimura | H01Q 1/42 |

* cited by examiner

*Primary Examiner* — Ricardo I Magallanes
*Assistant Examiner* — Yonchan J Kim
(74) *Attorney, Agent, or Firm* — CP LAW GROUP PC; Cy Bates

(57) ABSTRACT

An antenna array includes one or more substrates and four individual antennas in an orthogonal formation to improve radiation pattern independence. In various embodiments, a novel antenna array configuration is disclosed where one of the four antennas is orthogonal to two of the remaining three antennas. At least two of the four individual antennas are electrically coupled via transmission lines.

6 Claims, 7 Drawing Sheets

QUAD 5G NR MIMO ANTENNA ARRAY WITH TRANSMISSION LINES

CROSS-REFERENCE TO RELATED APPLICATIONS

This application claims benefit of priority with U.S. Provisional Application Ser. No. 62/892,350, filed Aug. 27, 2019; the entire contents of which are hereby incorporated by reference.

BACKGROUND

Field of the Invention

This invention relates to antennas; and more particularly, an antenna array configuration of four antennas in a slanted formation to improve antenna performance at the 5G NR band in the frequency range of 600 MHZ-6000 MHz, including increasing radiation pattern independence.

Description of the Related Art

A known improvement in the art of antennas is to improve wireless throughput with a Multiple Input Multiple Output (MIMO) system. This system is capable of transmitting and receiving multiple data streams simultaneously. However, at lower frequencies, especially near the 600 MHz range of 5G NR, the antennas have a lower independence relationship then at frequencies higher in the bandwidth, which degrades antenna performance. If would be beneficial in the art if the radiation pattern independence at the lower frequencies could be improved.

SUMMARY

The disclosure concerns a 5G NR MIMO antenna array comprising one or more substrates and four individual antennas. The four antennas are configured such that each antenna is orthogonal to two of the other three antennas, and may be further configured parallel with the other (fourth) remaining antenna.

Other advantages and benefits may be further appreciated from the appended detailed descriptions.

BRIEF DESCRIPTION OF THE DRAWINGS

Other features, combinations, and embodiments will be appreciated by one having the ordinary level of skill in the art of antennas and accessories upon a thorough review of the following details and descriptions, particularly when reviewed in conjunction with the drawings, wherein.

DETAILED DESCRIPTION

Figure 1:
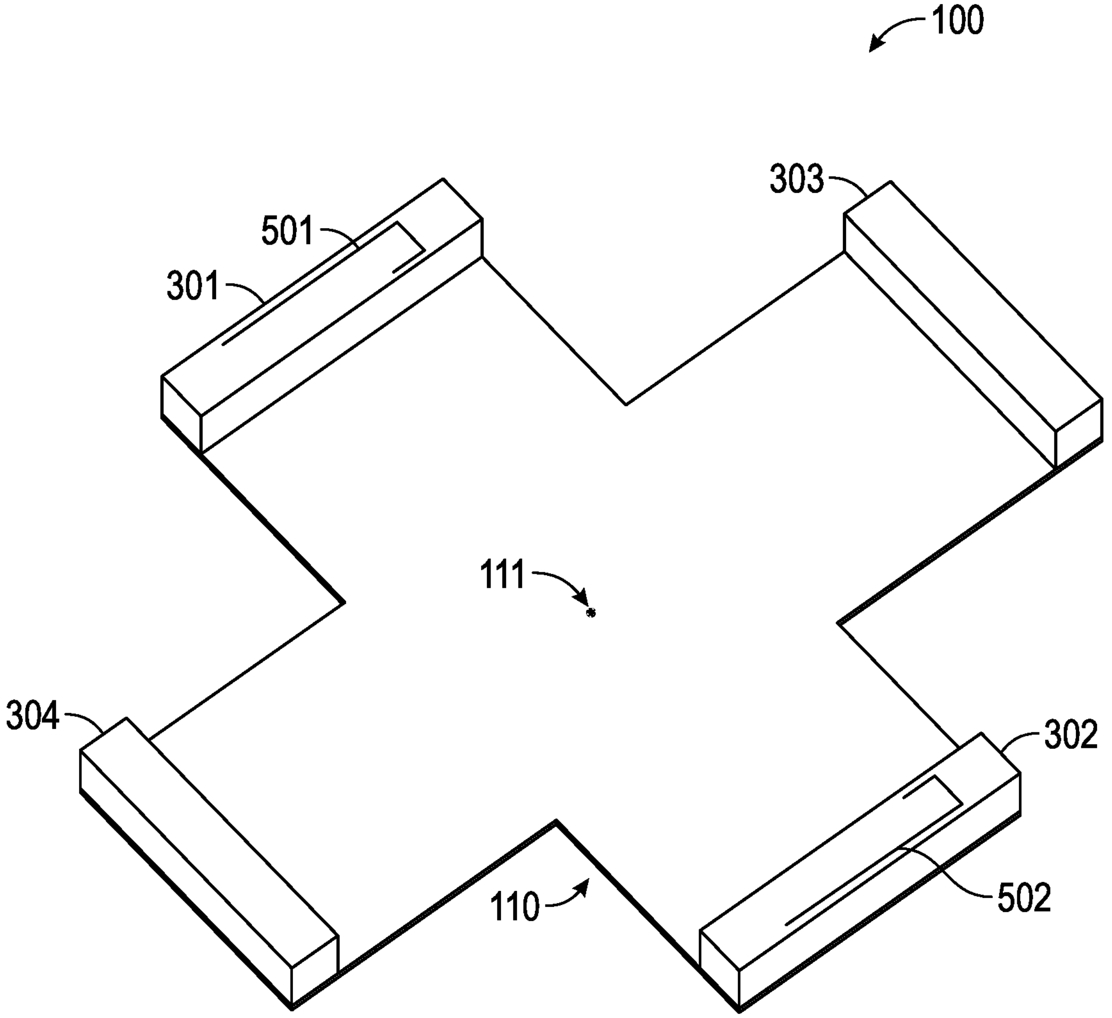
FIG. 1 shows a top view of the 5G NR MIMO antenna array in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

General Description of Embodiments

In a first embodiment, a 5G NR MIMO antenna array is disclosed. The 5G NR MIMO antenna array comprises a first planar substrate and a second planar substrate. The first planar substrate is configured to extend along a first longitudinal plane and having a first proximal end and a first distal end opposite the first proximal end. The second planar substrate is configured to extend along a second longitudinal plane and having a second proximal end and a second distal end opposite the second proximal end. The first planar substrate includes a first antenna and a second antenna each coupled to the first planar substrate, one of the first and second antennas being disposed at the first proximal end and the other of the first and second antennas being disposed at the first distal end. The second planar substrate includes a third antenna and a fourth antenna each coupled to the second planar substrate, one of the third and fourth antennas being disposed at the second proximal end and the other of the third and fourth antennas being disposed at the second distal end. The 5G NR MIMO antenna array further comprises a dielectric tapered spacer configured to be disposed between each of the first and second planar substrates thereby forming an angle between the first longitudinal plane and the second longitudinal plane, respectively, the angle comprising between and inclusive of one and eighty-nine degrees.

In the first embodiment the first antenna may be oriented parallel with the second antenna.

Furthermore, in the first embodiment, the third antenna may be oriented parallel with the fourth antenna.

In some embodiments a first radiation pattern corresponding to the first antenna may be configured to mirror a second radiation pattern corresponding to the second antenna.

In the first embodiment, the 5G NR MIMO antenna array may further comprise a plurality of dielectric tapered spacers.

The first embodiment may further comprise a housing, wherein the antenna array is contained within the housing.

In the first embodiment, the first through fourth antennas individually may comprise a surface mount ceramic antenna.

In some embodiments, the first planar substrate may be configured to be oriented in orthogonal relation with the second planar substrate.

In the first embodiment the first through fourth antennas may independently be oriented in an orthogonal relation with respect to two other antennas of the first through fourth antennas.

In a second embodiment, a 5G NR MIMO antenna array is disclosed. The 5G NR MIMO antenna array comprises one or more substrates, and first through fourth antennas comprising a first antenna, a second antenna, a third antenna and a fourth antenna. Each of the first through fourth antennas is coupled to the one or more substrates and the array is characterized in that each of the first through fourth antennas is independently oriented in an orthogonal relation with respect to two other antennas of the first through fourth antennas.

In the second embodiment, the first through fourth antennas may independently be oriented in a parallel relation with respect to one other antenna of the first through fourth antennas.

In the second embodiment, the one or more substrates may comprise a center point disposed at a center of the one or more substrates, wherein each of the first through fourth antennas is disposed radially equidistant from the center point.

In the second embodiment, a first radiation pattern corresponding to the first antenna may be configured to mirror a second radiation pattern corresponding to the second antenna.

In the second embodiment, the one or more substrates may comprise a first planar substrate and a second substrate. The first planar substrate is configured to extend along a first longitudinal plane and having a first proximal end and a first distal end opposite the first proximal end. The second planar substrate is configured to extend along a second longitudinal plane and having a second proximal end and a second distal end opposite the second proximal end.

In some embodiments, the 5G NR MIMO antenna array may comprise a dielectric tapered spacer configured to be disposed between each of the first and second planar substrates thereby forming an angle between the first longitudinal plane and the second longitudinal plane, respectively, the angle comprising between and inclusive of one and eighty-nine degrees.

The second embodiment may comprise a plurality of dielectric tapered spacers.

In the second embodiment, the first planar substrate may be configured to be oriented in orthogonal relation with the second planar substrate.

The second embodiment may further comprise a housing, wherein the antenna array is contained within the housing.

In the second embodiment, each of the first through fourth antennas may individually comprise a surface mount ceramic antenna.

In third embodiment, A 5G NR MIMO antenna array is disclosed. The 5G NR MIMO antenna array comprises a planar ground substrate, a first, second, third, and fourth antenna. The planar ground substrate is configured to extend along a longitudinal plane and having a proximal end and a distal end opposite the proximal end. The planar ground substrate further comprises a first side and a second side opposite the first side such that the proximal end, the distal end, the first side and the second side form a boundary of the planar ground substrate. The first and second antenna each are coupled to the planar ground substrate and one of the first and second antennas being disposed at the first proximal end and the other of the first and second antennas being disposed at the first distal end. The third antenna is disposed near the first side of the planar ground substrate and further configured to traverse the longitudinal plane. The third antenna having a first coaxial transmission line that electrically couples the third antenna to the planar ground substrate. The fourth antenna is disposed near the second side of the planar ground substrate and further configured to traverse the longitudinal plane. The fourth antenna having a second coaxial transmission line that electrically couples the fourth antenna to the planar ground substrate. The third antenna and fourth antenna are each positioned with respect to the longitudinal plane to form independent angles comprising between and inclusive of negative eighty-nine degrees and positive eight-nine degrees.

A function of the 5G NR MIMO antenna array is to improve signal reception and reduce polarization losses with the disclosed antenna configurations and orientations, especially at the lower frequencies of 5G NR. Certain embodiments can be further differentiated with a tapered dielectric spacer that allows two pairs of antennas to be angled relative to each other.

The first through third embodiments of the General Description should not be comingled or conflated with the first through third illustrated embodiments, since, while there may be overlapping subject matter, each of these forms a separate and distinct embodiment.

Manufacturing

Generally, the planar substrate is a printed circuit board made of industry standard material such as FR4, Kapton or Pyralux with printed circuit design affixed thereto. Otherwise, the planar substrate can be fabricated in accordance with the level and knowledge of one having skill in the art. Other examples without limitation include more specialized materials such as Duroid, Taconic, and LDS.

The antenna may be obtained commercially, for example and without limitation, 2JE19 Antenna (www.2j-antennas.com/antennas/single-internal-antennas/2je19-cellular-lte-surface-mount-ceramic-antenna/302). Alternatively, the antenna may be any that is customized in accordance with the level and knowledge of one having skill in the art.

The transmission line can be either coaxial cable(s) or printed transmission lines, including a microstrip or coplanar waveguide. Those with knowledge and skill in the art will appreciate that printed transmission line can be designed into a printed circuit board.

The coaxial cable may be obtained commercially, for example and without limitation, ACX1589-ND on Digi-Key (www.digikey.com/product-detail/en/amphenol-rf/135103-02-12-00/ACX1589-ND/2003922). Alternatively, the coaxial transmission line can be customized in accordance with the level and knowledge of one having skill in the art. The transmission line includes connectors for the purpose of coupling the radio with the antenna element. The connections can be any combinations of SMA, W.FL., U.FL or any other connections known in the art. Furthermore, each connection can be either Male or Female depending on both the radio and antenna element that the transmission line would couple.

Each of the components of the antenna array and related system described herein may be manufactured and/or assembled in accordance with the conventional knowledge and level of a person having skill in the art.

Definitions

For purposes herein the term "orthogonal" means at right angles.

The term "traverse" means to intersect or travel across

The term "antenna" means a device used to transmit or receive electromagnetic waves.

The term "substrate" means a flat or nearly flat surface that contains a conducting portion and can be used a holder of surface mount antennas.

The term "transmission line" means a conductor that couples a radio to an antenna.

First Illustrated Embodiment

Now turning to the drawings, FIG. 1 shows top view of a 5G NR MIMO antenna array (100) according to a first illustrated embodiment. The antenna array comprises a substrate (110), a first antenna (301), a second antenna (302), a third antenna (303), and a fourth antenna (304). The substrate has a center point (111) at the center therewith. The first through fourth antennas are configured such that each antenna is perpendicular to the two adjacent antennas, and parallel to the other antenna (furthest away). Furthermore, each of the antennas is radially equidistant from the center point. The first antenna has a first radiation pattern (501) and the second antennas has a second radiation pattern (502). The first and second radiation pattern are configured to mirror each other.

The first though fourth antennas (301, 302, 303, 304) can be characterized as surface mount ceramic antennas.

Figure 6:
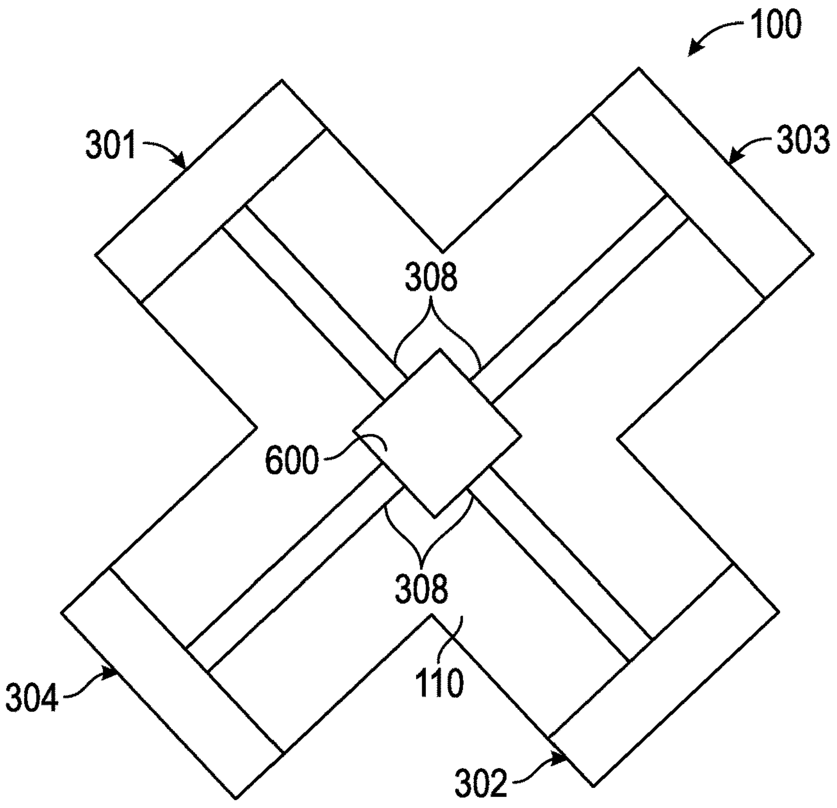
FIG. 6 shows a top view of the 5G NR MIMO antenna array with printed transmission line in accordance with the first illustrated embodiment.

FIG. 6 shows a top view of the 5G NR MIMO antenna array (100) in accordance with the first illustrated embodiment. The 5G NR MIMO antenna array comprises a substrate (110), a first antenna (301), a second antenna (302), a third antenna (303), and a fourth antenna (304). The antenna array further comprises a radio (600) and transmission line(s) (308). The radio is disposed on the substrate at a center point (111, FIG. 1). It will be appreciated by those have having knowledge and skill in the art that the radio can be placed in other locations other than the center point. The first through fourth antennas are each disposed on the substrate and have an equal distance from the radio. The transmission line couples each of the antennas to the radio. In this figure, the transmission is characterized as being a printed transmission line such as microstrip or coplanar waveguide, among other available options. Each of the first through fourth antennas are parallel to the antenna on the opposite side of the radio, and furthermore is orthogonal to the remaining two antennas that are not on the opposite side of the radio but are adjacent thereto.

Figure 7:
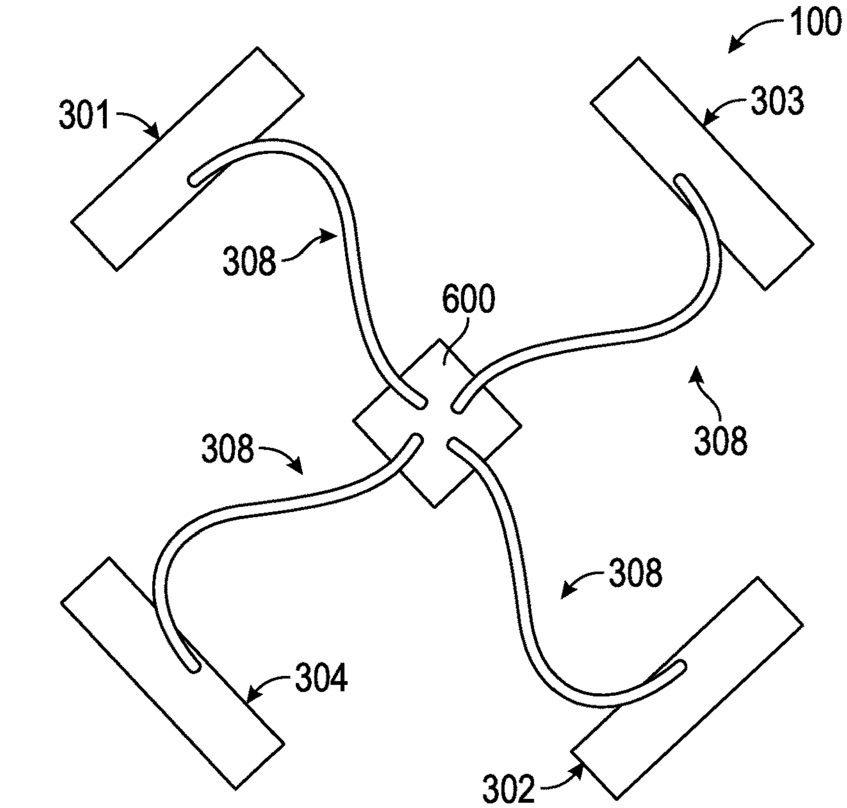
FIG. 7 shows a top view of the 5G NR MIMO antenna array with coaxial transmission line in accordance with the first illustrated embodiment.

FIG. 7 shows another top view of the 5G NR MIMO antenna array (100) with an alternative for transmission line(s) (308). In this 5G NR MIMO antenna array, the embodiment again comprises first through fourth antennas (301, 302, 303, 304), a radio (600), and the transmission lines which can be characterized as coaxial cable(s). The substrate (110, FIG. 5) is noticeably absent for each of the first through fourth antennas. The coaxial transmission couples each of the antennas to the radio without the need for a substrate. However, it will be appreciated with those have knowledge and skill in the art that the first through fourth antennas may still use individual substrates for purposes of mechanical support. Additionally, the radio may be disposed on its own substrate. The first through fourth antennas are each disposed radially from the radio and oriented orthogonal to two of the three other antennas and further oriented parallel to the last remaining antenna.

Second Illustrated Embodiment

Figure 2:
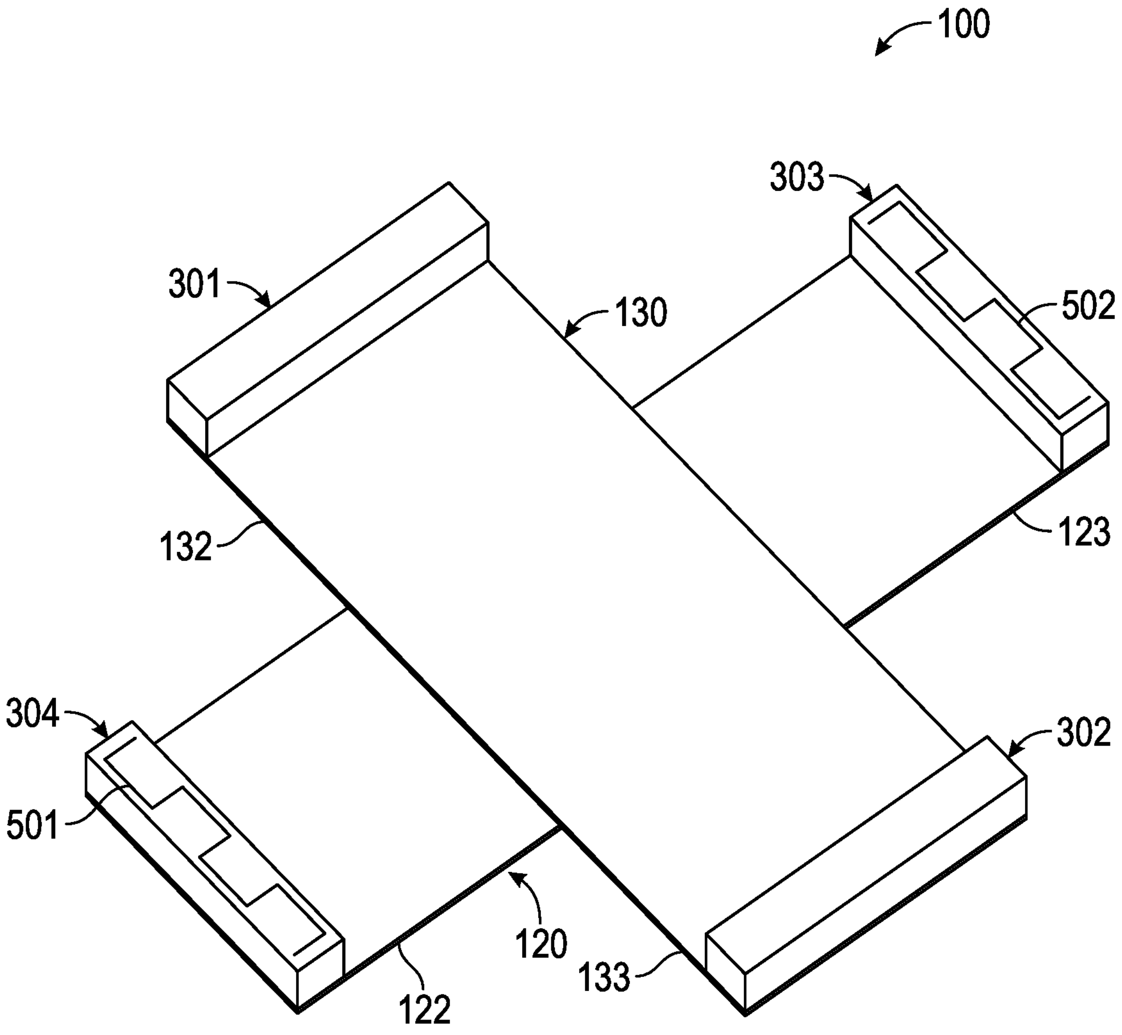
FIG. 2 shows a top view of the 5G NR MIMO antenna array in accordance with a second illustrated embodiment.

FIG. 2 shows a top view of the 5G NR MIMO antenna array (100) in accordance with a second illustrated embodiment. The 5G NR MIMO antenna array comprises a first planar substrate (120) with a first proximal end (122) and a first distal end (123), and a second planar substrate (130) with a second proximal end (132) and a second distal end (133). A first antenna (301) and a second antenna (302) are each disposed at the first proximal end and first distal end. Furthermore, a third antenna (303) and a fourth antenna (304) are each disposed on the second proximal end and the second distal end. The first and second antenna are parallel to each other. The third and fourth antenna are also parallel to each other. The first planar substrate and second planar substrate may be coupled by a tapered dielectric spacer (200, FIG. 3) that is between the first and second antenna and additionally is between the third and fourth antenna; or the first and second planar substrates may be overlapping and generally coplanar. The second planar substrate is overlapping the first planar substrate and creates an orthogonal orientation with the first planar substrate such that the first and second antennas are each individually orthogonal to the third and fourth antennas. In certain variations, the optional tapered dielectric spacer causes the second planar substrate to be angled relative to first planar substrate which creates an angle (210, FIG. 4) that measures between and inclusive of one and eighty-nine degrees, preferably between five and thirty degrees. The first and second antennas will produce a first radiation pattern (located at 501) and a second radiation pattern (located at 502). The first and second radiation patterns will generally be equal and opposite to each other. The third and fourth antennas may also comprise radiation patterns that are equal and opposite to one another.

Figure 3:
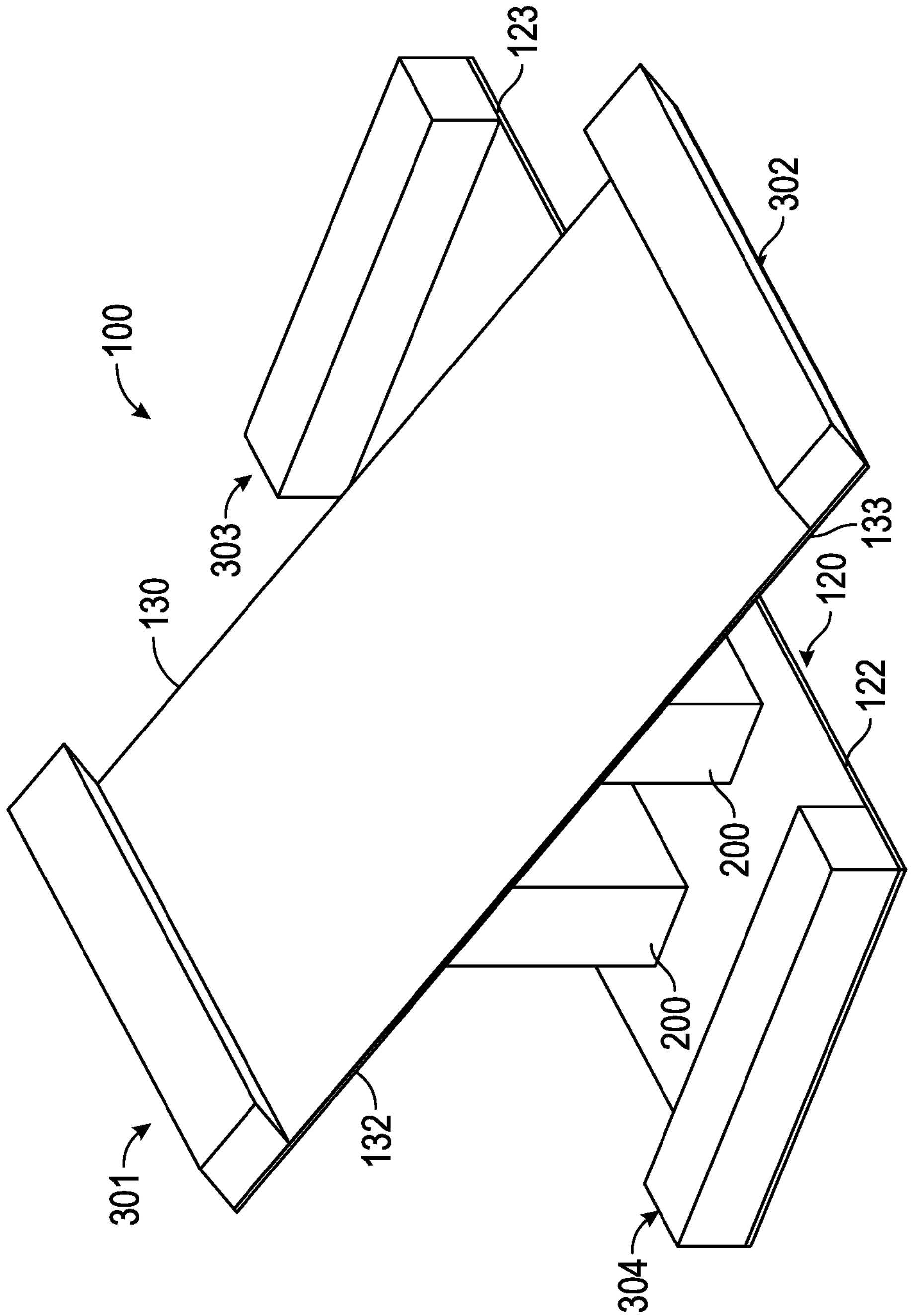
FIG. 3 shows an isometric view of the 5G NR MIMO antenna array in accordance with the illustrated second embodiment.

FIG. 3 shows an isometric view of the 5G NR MIMO antenna array (100) in accordance with the second illustrated embodiment. FIG. 3 comprises a first planer substrate (120) and a second planar substrate (130). A first antenna (301) and second antenna (302) are each disposed at the first planar substrate at a first proximal end (122) and a first distal end (123), respectively. Additionally, a third antenna (303) and fourth antenna (304) are each disposed at the second planar substrate at a second proximal end (132) and a second distal end (133). A tapered dielectric spacer (200) is coupled to the first planar substrate between the first and second antenna. The second planar substrate is coupled to the tapered dielectric space such that the second planar substrate extends away from the first planar substrate and would be characterized as having a high elevation relative to a horizontal plane. The second planar substrate forms an angle (210, FIG. 4) relative to the first planar substrate by the tapered dielectric spacer.

Figure 4:
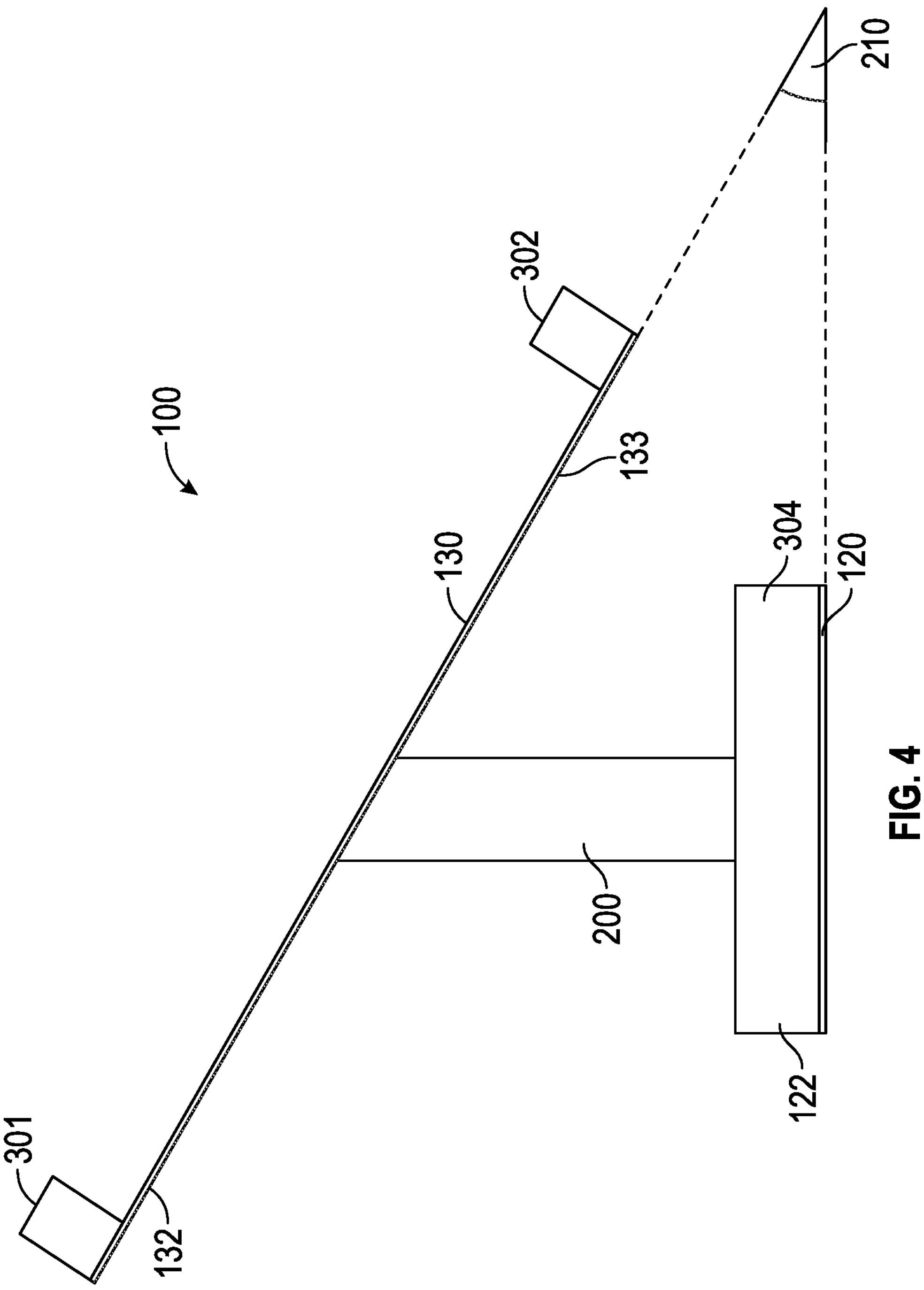
FIG. 4 shows a side view of the 5G NR MIMO antenna array in accordance with the second illustrated embodiment.

FIG. 4 shows a side view of the 5G NR MIMO (100) antenna array in accordance with the second illustrated embodiment with optional tapered spacer(s). The antenna array includes a first planar substrate (120), a second planar substrate (130), and at least one tapered dielectric spacer (200). The dielectric spacer couples the first planar substrate to the second planar substrate. The first and second planar substrates are oriented in an orthogonal formation with each other, and the second planar substrate creates an angle (210) with the first planar substrate. This angle can be between and inclusive of one and eighty-nine degrees. The figure shows the placement and orientation of antennas in view of FIG. 4.

A first antenna (301) is disposed on the first planar substrate and a third and fourth antenna (303, 304) are each disposed on the second planar substrate. A second antenna (302, FIG. 3) is not shown in this view. The first antenna is orthogonal to the third and fourth antenna.

Third Illustrated Embodiment

Figure 5:
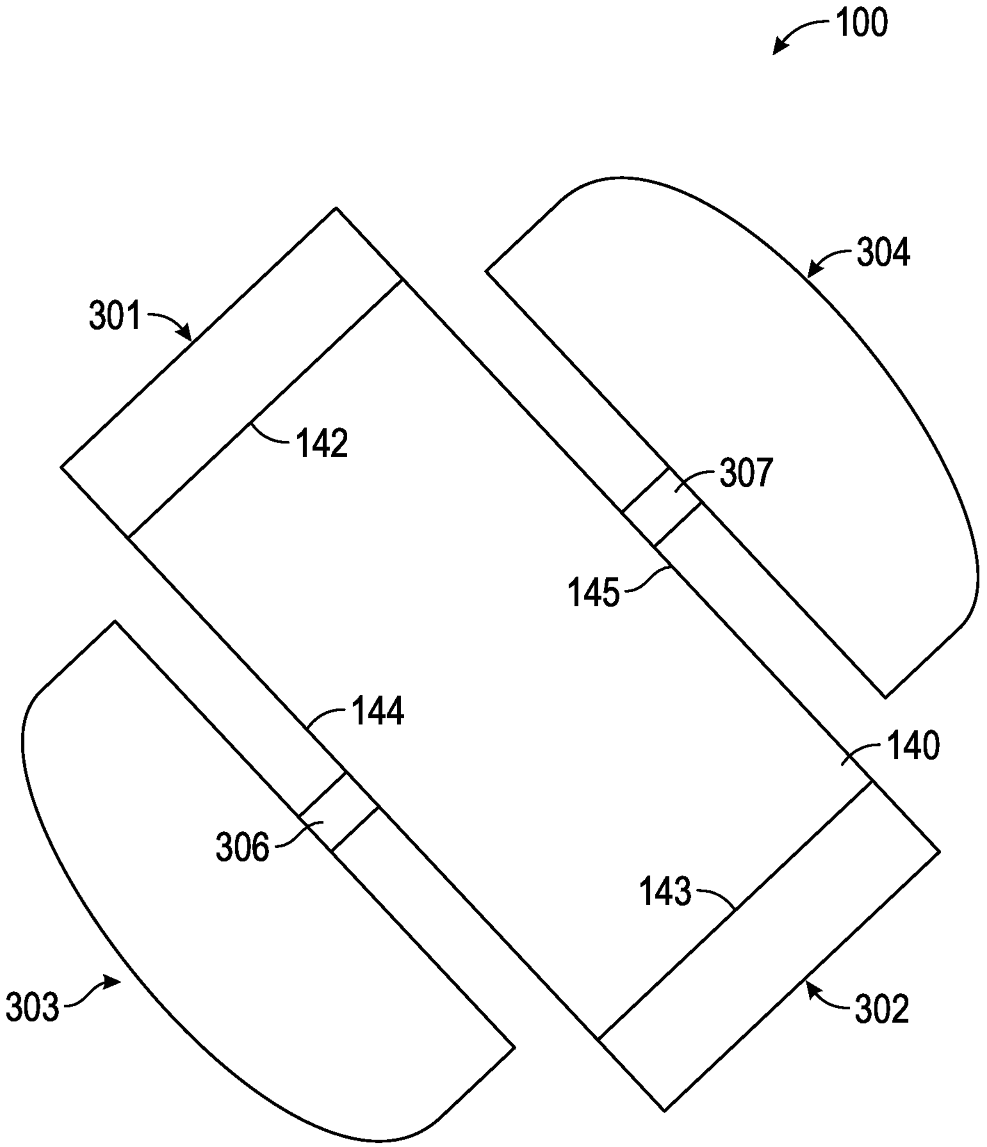
FIG. 5 shows a top view of the 5G NR MIMO antenna array in accordance with a third illustrated embodiment.

FIG. 5 shows a 5G NR MIMO antenna array (100) according to a third embodiment. The 5G NR MIMO antenna array comprises a planar ground substrate (140) having proximal end (142) and a distal end (143). A first antenna (301) and second antenna (302) are independently disposed at the proximal and distal end. The first antenna is parallel relative to the second antenna. A third antenna (303) is coupled to the planar ground substrate at a first side (144) and a fourth antenna (304) is coupled to the planar ground substrate at a second side (145). The third and fourth antennas are each orthogonal to the first and second antenna. Furthermore, the third antenna and fourth antenna can each independently be angled relative to the planar ground substrate which creates an angle from negative eighty-nine to positive eighty-nine degrees, where zero degrees is determined when the third or fourth antenna is coplanar with the planar ground substrate.

Performance

Figure 8:
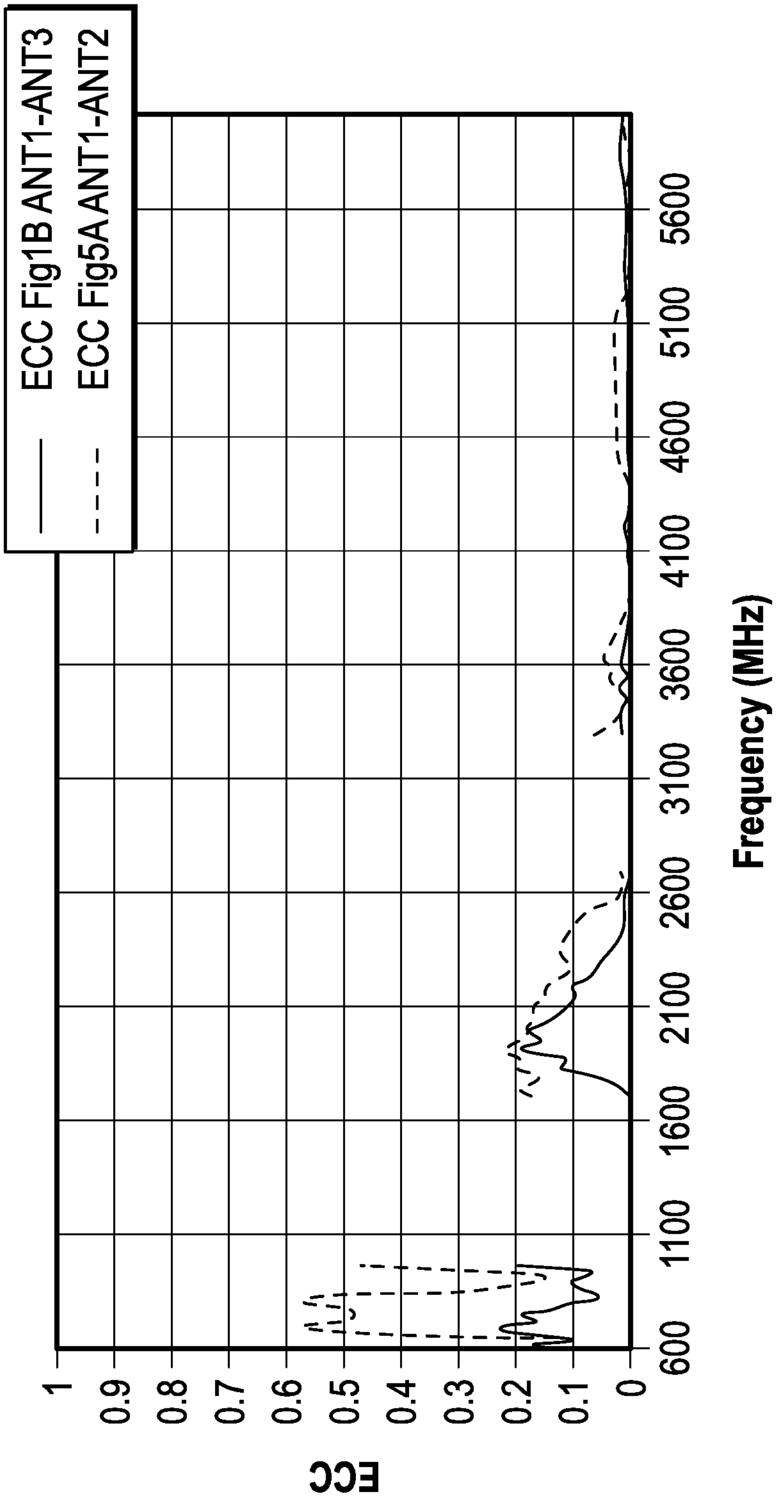
FIG. 8 shows a graph of the performance of ECC between two antenna pairs with (solid) and without (dotted) the slanted configuration.

FIG. 8 shows a graph of the Envelope Correlation Coefficient (ECC) of a pair of antennas in collinear orientation compared to a pair of antennas in a slanted formation over a frequency range. The x-axis is frequency range (600 MHz-6000 MHz), and the y-axis is ECC (0-1). The pair of collinear antennas is represented by a dotted line (FIG. 5A ANT1-ANT2). The pair of slanted antennas is represented by a solid black line (FIG. 1B ANT1-ANT3). ECC mathematically represents how independent a pair of antennas radiation patterns are. An ECC of 0 would signify 100% independence. In a MIMO antenna array setup, having antennas that are as independent from each other as possible signifies that there is a high likelihood the signal will be received by at least one of the antennas. Therefore, a lower ECC represents an antenna's increased performance and efficiency and is advantageous. The graph shows an improved performance in the range of 1600-2600 MHz and a significant improvement at the lower frequencies of 600-900 MHz. With 5G NR expanding to the lower frequencies near 600 MHz, a slanted antenna formation can greatly improve the antenna's performance.

FEATURE LIST

5G NR MIMO antenna array (100)
first planar substrate (120)
first proximal end (122)
first distal end (123)
second planar substrate (130)
second proximal end (132)
second distal end (133)
first antenna (301)
second antenna (302)
third antenna (303)
fourth antenna (304)
dielectric tapered spacer (200)
angle (210)
first radiation pattern (501)
second radiation pattern (502)
substrate (110)
center point (111)
planar ground substrate (140)
proximal end (142)
distal end (143)
first side (144)
second side (145)
first coaxial transmission line (306)
second coaxial transmission line (307)
transmission line (308)
radio (600)

What is claimed is:

1. A 5G NR MIMO antenna array, comprising:
a planar ground substrate;
the planar ground substrate configured to extend along a longitudinal plane and having a proximal end and a distal end opposite the proximal end, and the planar ground substrate further comprising a first side and a second side opposite the first side such that the proximal end, the distal end, the first side and the second side form a boundary of the planar ground substrate;
a first and a second antenna each mounted to the planar ground substrate, one of the first and second antennas being disposed on the first proximal end and the other of the first and second antennas being disposed on the first distal end;
a third antenna,
the third antenna electrically coupled to the first side of the planar ground substrate by a first coaxial transmission line, the third antenna being configured to traverse the longitudinal plane;
a fourth antenna,
the fourth antenna electrically coupled to the second side of the planar ground substrate by a second coaxial transmission line, the fourth antenna being configured to traverse the longitudinal plane;
characterized in that:
each of the first through fourth antennas is independently oriented in an orthogonal relation with respect to two other antennas of the first through fourth antennas; and
wherein the third antenna and the fourth antenna are each positioned with respect to the longitudinal plane to form independent angles comprising between and inclusive of negative eighty-nine degrees and positive eight-nine degrees.

2. The 5G NR MIMO antenna array of claim 1, wherein each of the first through fourth antennas is independently oriented in a parallel relation with respect to one other antenna of the first through fourth antennas.

3. The 5G NR MIMO antenna array of claim 1, further comprising a center point disposed at a center of the planar ground substrate, wherein each of the first through fourth antennas is radially equidistant from the center point.

4. The 5G NR MIMO antenna array of claim 1, wherein a first radiation pattern corresponding to the first antenna is configured to mirror a second radiation pattern corresponding to the second antenna.

5. The 5G NR MIMO antenna array of claim 1, further comprising a housing, wherein the 5G NR MIMO antenna array is contained within the housing.

6. The 5G NR MIMO antenna array of claim 1, wherein the third antenna is independently oriented in a parallel relation with respect to the fourth antenna.

* * * * *